(12) United States Patent
Jang et al.

(10) Patent No.: US 12,394,839 B2
(45) Date of Patent: Aug. 19, 2025

(54) BATTERY MODULE AND BATTERY PACK INCLUDING THE SAME

(71) Applicant: LG Energy Solution, LTD., Seoul (KR)

(72) Inventors: Sunghwan Jang, Daejeon (KR); Junyeob Seong, Daejeon (KR); Seung Min Song, Daejeon (KR)

(73) Assignee: LG Energy Solution, LTD., Seoul (KR)

( * ) Notice: Subject to any disclaimer, the term of this patent is extended or adjusted under 35 U.S.C. 154(b) by 628 days.

(21) Appl. No.: 17/764,140

(22) PCT Filed: Aug. 5, 2021

(86) PCT No.: PCT/KR2021/010350
§ 371 (c)(1),
(2) Date: Mar. 25, 2022

(87) PCT Pub. No.: WO2022/065672
PCT Pub. Date: Mar. 31, 2022

(65) Prior Publication Data
US 2022/0416327 A1    Dec. 29, 2022

(30) Foreign Application Priority Data
Sep. 22, 2020    (KR) .................... 10-2020-0122294

(51) Int. Cl.
*H01M 10/658*    (2014.01)
*H01M 50/211*    (2021.01)
(Continued)

(52) U.S. Cl.
CPC ....... *H01M 10/658* (2015.04); *H01M 50/211* (2021.01); *H01M 50/218* (2021.01); *H01M 50/507* (2021.01)

(58) Field of Classification Search
CPC .......... H01M 50/262; H01M 2220/20; H01M 50/204
See application file for complete search history.

(56) References Cited

U.S. PATENT DOCUMENTS 11,515,593  B2 *  11/2022  Jeong .................. H01M 50/209
2014/0093751  A1    4/2014  Schaefer et al.
(Continued)

FOREIGN PATENT DOCUMENTS

CN    103337602    10/2013
CN    107017364    8/2017
(Continued)

*Primary Examiner* — Abdullah A Riyami
*Assistant Examiner* — Nader J Alhawamdeh
(74) *Attorney, Agent, or Firm* — Bryan Cave Leighton Paisner LLP

(57) ABSTRACT

A battery module including: a battery cell stack in which a plurality of battery cells are stacked; a housing that houses the battery cell stack; a busbar frame that covers the front and rear surfaces of the battery cell stack; and an insulating member that has an upper part and two side parts, and surrounds the upper surface and both side surfaces of the battery cell stack, and the insulating member is positioned between the battery cell stack and the housing. Both side parts of the insulating member are formed by alternately and repeatedly folding a portion of the insulating member.

9 Claims, 4 Drawing Sheets

(51) Int. Cl.
   *H01M 50/218*   (2021.01)
   *H01M 50/507*   (2021.01)

(56) References Cited

U.S. PATENT DOCUMENTS

| | | |
|---|---|---|
| 2015/0004498 A1 | 1/2015 | Cheng et al. |
| 2016/0293915 A1 | 10/2016 | Tsuchiya et al. |
| 2017/0190264 A1 | 7/2017 | Kim et al. |
| 2017/0214017 A1* | 7/2017 | Pflueger .............. H01M 10/658 |
| 2017/0222285 A1* | 8/2017 | Li .................... H01M 10/6556 |
| 2018/0138476 A1* | 5/2018 | Yamazaki ........... H01M 10/643 |
| 2018/0138565 A1* | 5/2018 | Lee ................... H01M 10/6554 |
| 2018/0175343 A1 | 6/2018 | Choi et al. |
| 2018/0175464 A1* | 6/2018 | Kim .................. H01M 10/6555 |
| 2018/0287116 A1* | 10/2018 | Seo ..................... H01M 50/258 |
| 2019/0006647 A1 | 1/2019 | Ryu et al. |
| 2019/0267591 A1 | 8/2019 | Park et al. |
| 2020/0194851 A1* | 6/2020 | Seo ................... H01M 10/625 |
| 2020/0388805 A1* | 12/2020 | Yoo .................. H01M 10/6567 |
| 2021/0194098 A1* | 6/2021 | Lee ......................... B60L 50/64 |
| 2021/0273267 A1* | 9/2021 | Yoon ................. H01M 50/502 |
| 2021/0296738 A1* | 9/2021 | Lee ................... H01M 50/557 |
| 2022/0037710 A1* | 2/2022 | Yoon ................. H01M 10/658 |
| 2022/0045383 A1* | 2/2022 | Choi .................. H01M 50/503 |
| 2022/0393322 A1* | 12/2022 | Jang .................... H01M 50/593 |
| 2022/0416327 A1* | 12/2022 | Jang .................... H01M 50/507 |
| 2023/0282925 A1* | 9/2023 | Jang .................... H01M 50/291 |
| | | 429/159 |
| 2023/0307759 A1* | 9/2023 | Baek .................. H01M 50/242 |
| 2023/0344061 A1* | 10/2023 | Kim .................... H01M 50/211 |
| 2023/0352793 A1* | 11/2023 | Kim .................... H01M 50/262 |

FOREIGN PATENT DOCUMENTS

| | | |
|---|---|---|
| CN | 209526137 U | 10/2019 |
| CN | 209592168 U | 11/2019 |
| CN | 209822769 U | 12/2019 |
| CN | 211265580 U | 8/2020 |
| EP | 3282515 A1 | 2/2018 |
| JP | 2016012468 | 1/2016 |
| JP | 2020-501320 A | 1/2020 |
| JP | 2020-523774 A | 8/2020 |
| KR | 10-2018-0018109 A | 2/2018 |
| KR | 10-1916720 B1 | 11/2018 |
| KR | 10-2018721 B1 | 9/2019 |
| KR | 10-2019-0110782 A | 10/2019 |
| KR | 10-2020-0030964 A | 3/2020 |
| KR | 10-2020-0030967 A | 3/2020 |

* cited by examiner

[FIG. 1]
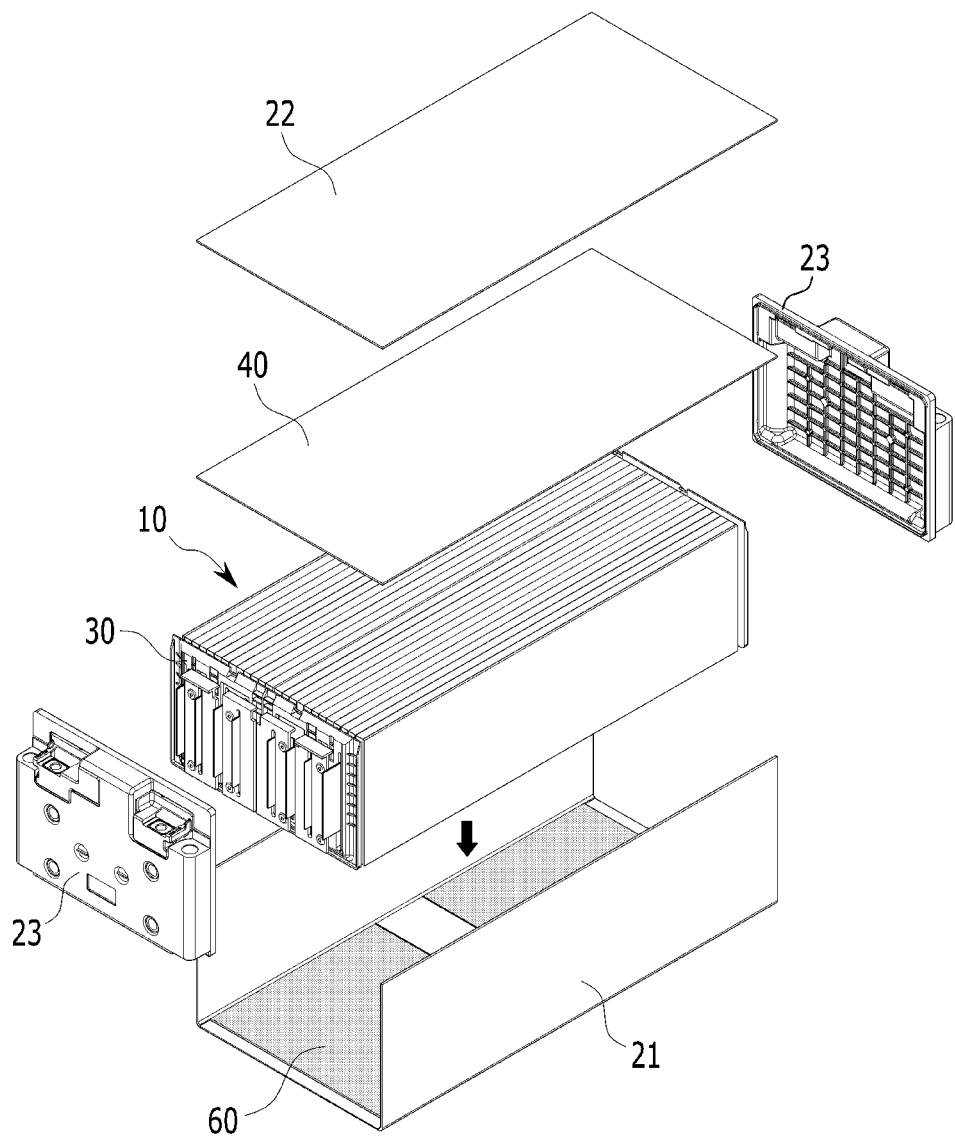

[FIG. 2]
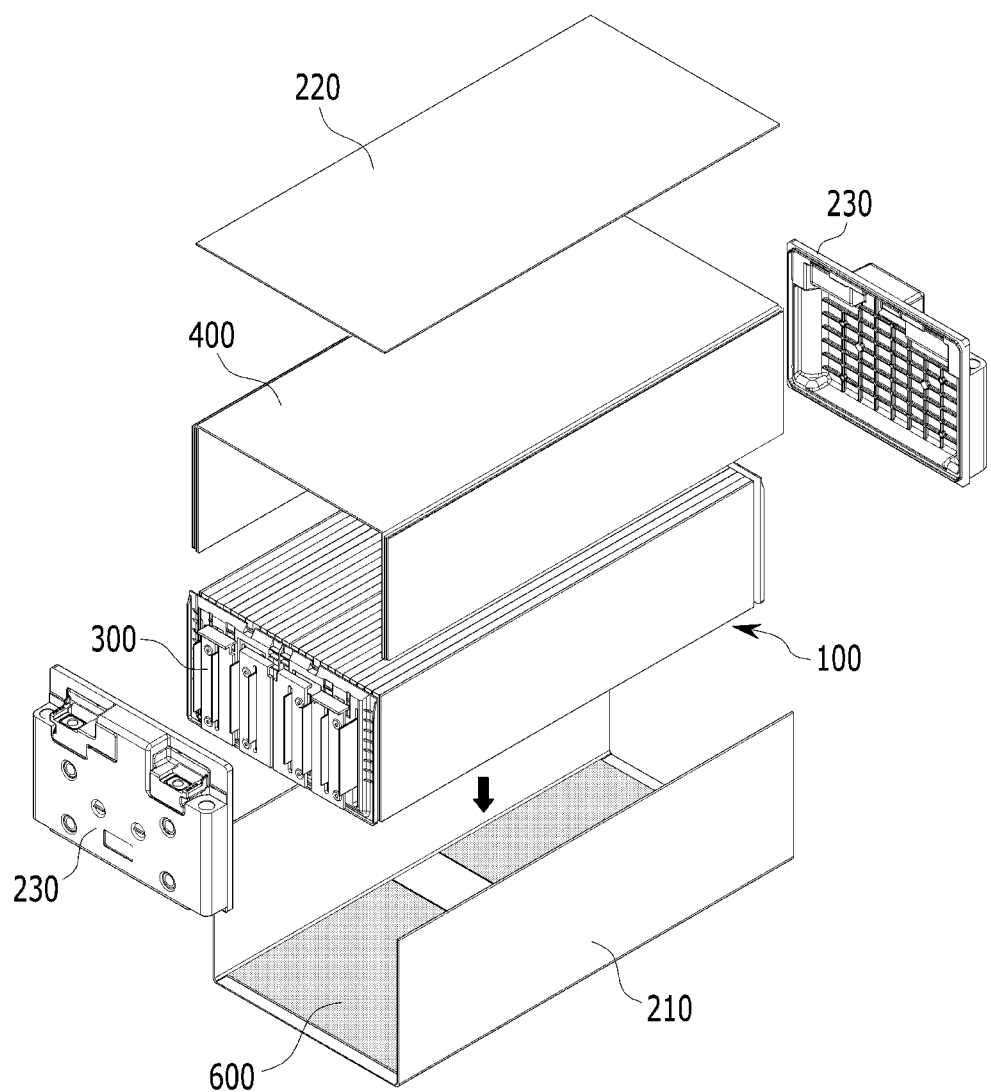

【FIG. 3】
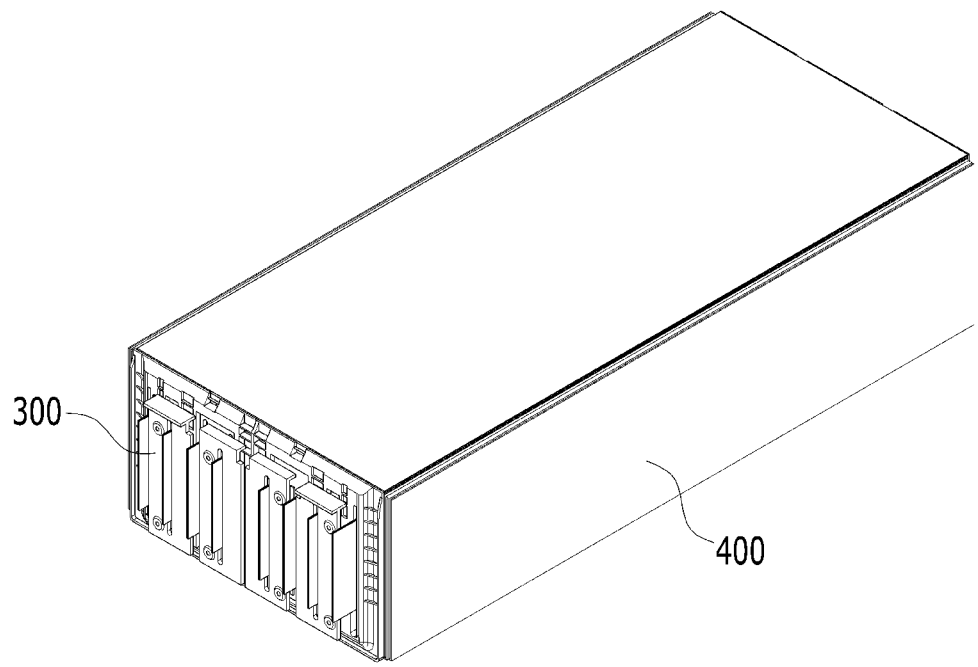
【FIG. 4】
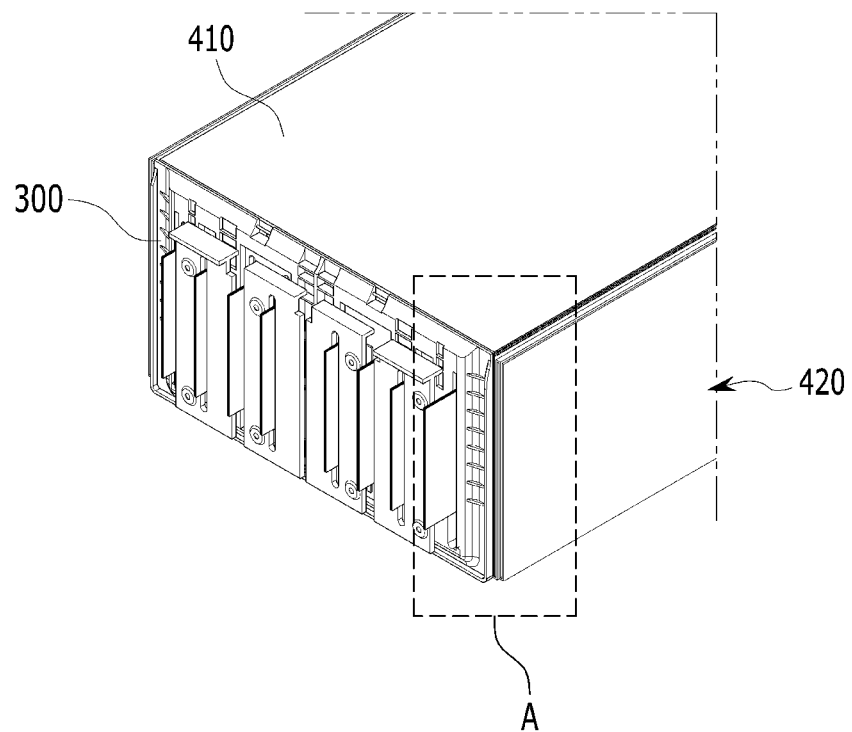

[FIG. 5]
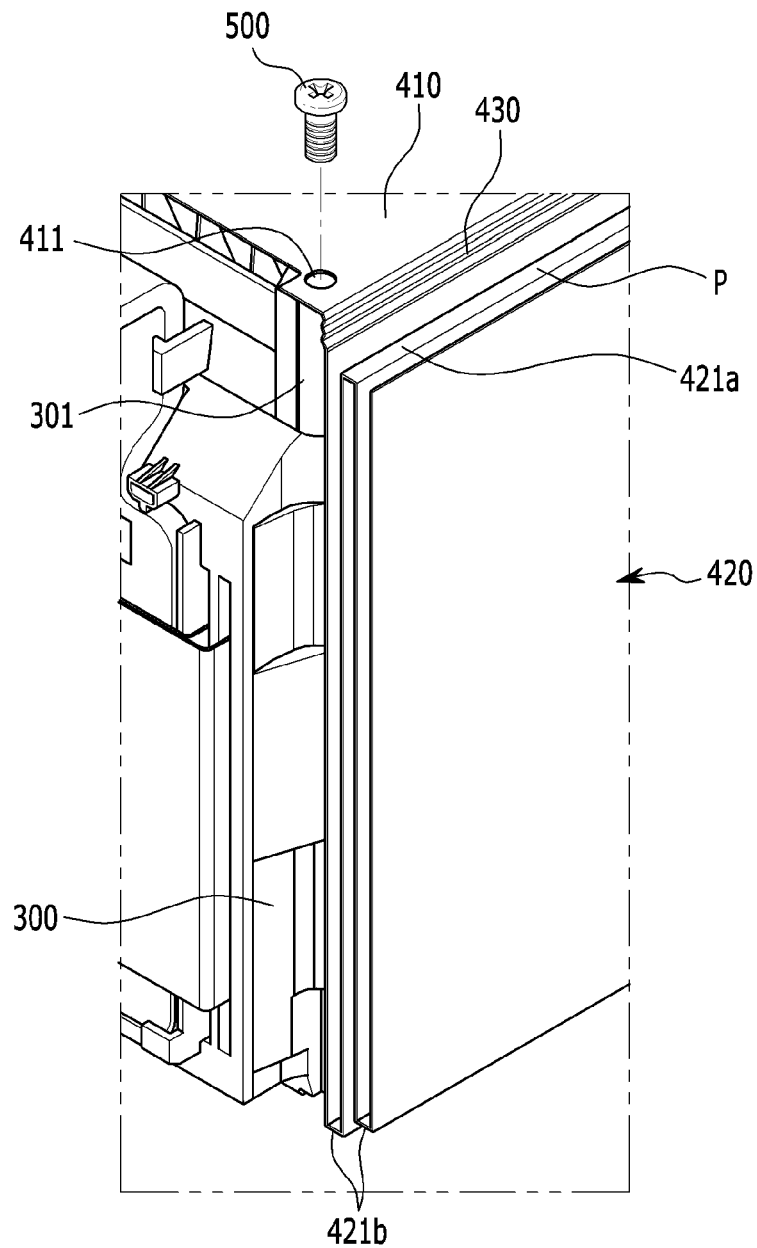

BATTERY MODULE AND BATTERY PACK INCLUDING THE SAME

CROSS-REFERENCE TO RELATED APPLICATIONS

This application is a US national phase of international application No. PCT/KR2021/010350 filed on Aug. 5, 2021, and claims the benefit of Korean Patent Application No. 10-2020-0122294 filed on Sep. 22, 2020 with the Korean Intellectual Property Office, the disclosures of which are incorporated herein by reference in their entirety.

TECHNICAL FIELD

The present disclosure relates to a battery module and a battery pack including the same, and more particularly, to a battery module that ensures insulation performance, and a battery pack including the same.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack having a multi-module structure, which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery module may include a battery cell stack in which a plurality of battery cells are stacked, a housing for the battery cell stack, and a busbar frame for covering the front and rear surfaces of the battery cell stack.

FIG. 1 illustrates a conventional battery module.

As illustrated in FIG. 1, the conventional battery module may include a battery cell stack 10 in which a plurality of battery cells are stacked, a housing 21 that is formed of two side parts and a bottom part and houses the battery cell stack 10, an upper plate 22 that covers the upper surface of the battery cell stack 10, a busbar frame 30 that covers the front and rear surfaces of the battery cell stack 10, end plates 23 that cover the outer surfaces of the busbar frame 30, respectively, and a thermally conductive resin layer 60 that is arranged between the bottom surface of the battery cell stack 10 and the bottom part of the housing 21. Further, an insulating film 40 can be arranged between the upper plate 22 and the upper surface of the battery cell stack 10 to insulate the battery cell stack 10.

However, there was a problem that the insulating film 40 is formed to be limited to the upper surface of the battery cell stack 10 and thus, insulation is not ensured between the battery cell stack 10 and the housing 21 for covering the two side surfaces and the lower surface of the battery cell stack 10.

SUMMARY

It is an objective of the present disclosure to provide a battery module that ensures insulation performance, and a battery pack including the same.

The objectives of the present disclosure are not limited to the aforementioned objective, and other objects, which are not described herein, should be clearly understood by those skilled in the art from the following detailed description.

According to one exemplary embodiment of the present disclosure, there is provided a battery module comprising: a battery cell stack in which a plurality of battery cells are stacked; a housing for the battery cell stack; a busbar frame that covers the front and rear surfaces of the battery cell stack; and an insulating member that is formed of an upper part and two side parts, and is formed to wrap the upper surface and both side surfaces of the battery cell stack between the battery cell stack and the housing, wherein both side parts of the insulating member are formed by alternately folding a plurality of surfaces.

Each of the side parts of the insulating member may be formed between the respective side part of the housing and the corresponding outermost battery cell of the battery cell stack.

Each of the side parts of the insulating member may include an elastic material.

Each of the side parts of the insulating member may be folded downward from the upper part, and then folded upward again from the portion where the bottom and two side parts of the housing meet, and the folds may be repeated to form the two side parts of the insulating member.

The downwardly folded part and the upwardly folded part may include two folded parts, respectively.

Each of the plurality of folded parts may be formed in a size corresponding to the outermost battery cell of the battery cell stack.

A folding part may be formed in the portion where the plurality of surfaces are folded, and the folding part may be formed in a direction perpendicular to the plurality of surfaces.

A wrinkled part may be formed between the upper part and two side parts of the insulating member.

The two side parts of the insulation member may be joined to each other through the side surface of the busbar frame and an adhesive member.

According to another embodiment of the present disclosure, there is provided a battery pack comprising the above-mentioned battery module.

A battery module and a battery pack including the same according to embodiments of the present disclosure provide the effects of ensuring the insulating performance of the battery module via the insulating member that surrounds the upper part and both side parts of the battery cell stack, and at the same time, absorbs the swelling of the battery cells through both side parts of the insulating member formed by alternately folding.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an illustration of a conventional battery module;

FIG. 2 is an exploded perspective view showing a battery module according to one exemplary embodiment of the present disclosure;

FIG. 3 is an illustration of an insulating member according to an exemplary embodiment of the present disclosure assembled on a battery cell stack;

FIG. 4 is an illustration of an insulating member according to an exemplary embodiment of the present disclosure assembled on a battery cell stack; and FIG. 5 is an enlarged view of section A of FIG. 4.

DETAILED DESCRIPTION

It should be appreciated that the exemplary embodiments, which will be described below, are illustratively described to assist in the understanding of the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Hereinafter, a battery module according to one embodiment of the present disclosure will be described with reference to FIG. 2.

FIG. 2 is an exploded perspective view showing a battery module according to an exemplary embodiment of the present disclosure.

As illustrated in FIG. 2, a battery module according to an exemplary embodiment of the present disclosure includes a battery cell stack 100 in which a plurality of battery cells 110 are stacked, a housing 210 that houses the battery cell stack 100, and a busbar frame 300 that coves the front and rear surfaces of the battery cell stack 100. Also, the battery module includes an insulating member 400 that is formed of an upper surface and both side surfaces, and is formed so as to wrap the upper surface and both side surfaces of the battery cell stack 100 between the battery cell stack 100 and the housing 210.

The battery cell is a secondary battery and may be configured into a pouch-type secondary battery. Such a battery cell may be composed of a plurality of cells, and the plurality of battery cells may be stacked together so as to be electrically connected to each other, thereby forming the battery cell stack 100. Each of the plurality of battery cells may include an electrode assembly, a battery case, and an electrode lead protruding from the electrode assembly.

According to the present embodiment, as shown in FIG. 2, the housing 210 may be formed in a U-shaped frame shape. The housing 210 is formed so as to have opened upper part and to house the battery cell stack 100. The housing 210 may be formed of two side parts facing each other and a bottom part. The battery cell stack 100 is housed in the housing 210 so that the left and right surfaces correspond to the two side parts of the housing, respectively, and the lower surface of the battery cell stack 100 corresponds to the bottom part of the housing 210.

The upper plate 220 is formed so as to cover the battery cell stack 100 on the upper part of the housing 210, which has an open upper part. In this case, the upper plate 220 and the housing 210 can be joined to each other by welding. The battery cell stack 100 can be covered vertically and horizontally via the housing 210 and the upper plate 220.

The end plate 230 is formed so as to cover the front and rear surfaces of the battery cell stack 100, and thus can physically protect the battery cell stack 100, the busbar frame 300, and other electronic devices connected thereto. Further, the end plate 230 can include a structure for mounting the battery module to the battery pack.

The busbar frame 300 is formed between the battery cell stack 100 and the end plate 230 to electrically connect the electrode leads formed in the plurality of battery cells. A plurality of busbars are mounted on the busbar frame, and voltage information and the like of the plurality of battery cells can be sensed through the busbars. The sensed information can be transmitted to the battery pack including the battery module through a connector (not shown) connected to the busbar frame. An insulating cover (not shown) may be formed between the busbar frame 300 and the end plate 230.

The thermally conductive resin layer 600 may be formed between the lower surface of the battery cell stack 100 and the bottom part of the housing 210. The thermally conductive resin layer 600 can transfer the heat generated from the battery cell stack 100 to the outside to cool the battery module. The thermally conductive resin layer 600 may include a thermal resin.

According to the present embodiment, the battery module may further include an insulating member 400 having an upper part and two side parts, and is formed so as to wrap the upper surface and both side surfaces of the battery cell stack 100 between the battery cell stack 100 and the housing 210.

Conventionally, the insulating member is formed so as to cover only the upper surface of the battery cell stack, and thus, there is a problem that the insulation performance between both side surfaces of the battery cell stack and both side parts of the housing cannot be ensured.

Therefore, according to the present embodiment, the insulating member 400 integrally having the upper part and two side parts can be formed so as to cover the upper surface and both side surfaces of the battery cell stack 100, thereby ensuring insulation performance between the battery cell stack 100 and both side parts of the housing 210. Further, the upper part and both side parts of the insulating member 400 are integrally formed, so that the insulating member 400 can be easily mounted on the battery cell stack 100.

The insulating member 400 may be formed of an insulating film. Also, the insulating member may be formed of a shrinkable tube. As described above, the insulating member 400 is formed of a material that completely covers the battery cell stack 100 while being thin and lightweight, and thus, can improve the insulating performance of the battery module.

Hereinafter, the two side parts of the insulating member according to an exemplary embodiment of the present disclosure will be described with reference to FIGS. 2 to 5.

FIG. 3 is an illustration of an insulating member according to an exemplary embodiment of the present disclosure assembled on a battery cell stack. FIG. 4 illustrates an insulating member according to another exemplary embodiment of the present disclosure assembled on a battery cell stack. FIG. 5 is an enlarged view of a section A of FIG. 4, which is a diagram showing both side surface parts of an insulating member according to one embodiment of the present disclosure.

As illustrated in FIGS. 2 to 5, both side parts 420 of the insulating member according to an exemplary embodiment of the present disclosure are formed by alternately folding the insulating member multiple times to form a plurality of folded parts, whereby when a swelling phenomenon occurs in a plurality of battery cells in the battery cell stack 100 that is stacked in a direction perpendicular to the side parts 420, both side parts 420 including the plurality of folded parts can absorb the swelling.

Thereby, both side parts 420 of the insulating member 400 can ensure insulation performance in the direction of both side surfaces of the battery cell stack 100, and at the same time, absorb the swelling acting on both side surfaces of the battery cell stack 100.

According to the present embodiment, both side surface parts 420 of the insulating member 400 may be formed between the respective side parts of the housing 210 and the outermost battery cell of the battery cell stack 100. Therefore, the swelling generated from the battery cell stack 100 can be absorbed inside the side parts of the housing 210, thereby ensuring the structural stability of the battery module. Both side parts 420 of the insulating member 400 may include an elastic material. Thereby, the swelling generated from the battery cell stack 100 can be absorbed more efficiently.

Both side parts 420 are folded downward from the upper part 410 and then folded upward from the portion where the bottom part and side parts of the housing 210 meet, and the folds may be repeated to form the side parts of the insulating member 400. As illustrated in FIG. 5, the downwardly folded part 421a and the upwardly folded part 421b may be formed by two parts, respectively. In a preferred embodiment, the plurality of folded parts includes one folded part folded downwards and two folded parts folded upwards, so that the elastic force through the plurality of folded parts can properly act on the side surface of the battery cell stack 100. If too many folded parts are formed, both side parts occupy too much space between the battery cell stack and the housing. Therefore, it is preferable that two upwardly folded parts and two downwardly folded parts are formed as in the present embodiment.

According to this embodiment, each of the plurality of the folded parts may be formed in a size corresponding to the size of the outermost battery cell of the battery cell stack 100. Thereby, when swelling occurs from a plurality of battery cells, it is possible to absorb all the swelling occurring in a portion corresponding to the surface of the battery cell.

In both side parts 420, a folding part may be formed in a portion where the side parts are folded in an upward and downward direction. The folding part may include a folded surface P formed in a direction perpendicular to the plurality of folded parts. As the folded surface P is formed in a direction perpendicular to the plurality of folded parts, a space can be provided between the plurality of folded parts, and based on this, an elastic force can be provided in a direction perpendicular to the plurality of folded parts. The elastic force can help absorb the swelling of the battery cell stack 100.

Both side parts 420 can be joined to each other through the side surfaces of the busbar frame 300 and the adhesive member 310. Thereby, both side parts 420 of the insulating member 400 can be fixed on the busbar frame 300 to stably perform the insulating function and swelling absorption function of the battery cell stack 100. The adhesive member 310 may include a double-sided tape or a liquid adhesive.

A wrinkled part 430 may be formed between the upper part 410 and both side parts 420 of the insulating member 400. The wrinkled part 430 can connect the upper part 410 and both side surface parts 420. An angle formed by the upper part 410 and both side parts 420 of the insulating member 400 through the wrinkled part 430 may be flexibly adjusted. Thereby, when assembling the insulating member 400, the insulating member 400 can be gently seated on both side surfaces and upper surface of the battery cell stack 100 without interference between both side surfaces of the battery cell stack 100 and both side surface parts 420 of the insulating member 400.

The battery module according to the present embodiment further includes a fixing member 500 that couples the upper part 410 of the insulating member 400 and both upper end parts of the sides of the busbar frame 300. More specifically, holes 411 are formed on both sides of the upper part 410 of the insulating member 400, insertion parts 301 are formed in both upper end parts of the sides of the busbar frame 300, and the fixing member 500 is inserted into the insertion part 301 through the hole 411, so that the insulating member 400 and the busbar frame 300 can be coupled. The fixing member 500 may be a bolt. The bolt is fastened to the insertion part 301 to couple the insulating member 400 and the busbar frame 300.

The above-mentioned battery module can be included in a battery pack. The battery pack may have a structure in which one or more of the battery modules according to the present embodiment are gathered, and packed together with a battery management system (BMS) and a cooling device to control and manage the battery's temperature, voltage, etc.

The above-mentioned battery module and the battery pack including the same can be applied to various devices. Such a device can be applied to a vehicle means such as an electric bicycle, an electric vehicle, or a hybrid vehicle, but the present disclosure is not limited thereto, and is applicable to various devices that can use a battery module, which also falls within the scope of the present disclosure.

Although the invention has been shown and described above with reference to the preferred embodiments, the scope of the present disclosure is not limited thereto, and numerous other modifications and embodiments can be devised by those skilled in the art, which will fall within the spirit and scope of the invention described in the appended claims. Further, these modified embodiments should be understood to be commensurate with the technical spirit or perspective of the present disclosure.

[Description of Reference Numerals]

| | |
|---|---|
| 10, 100: battery cell stack | 21, 200: housing |
| 210: U-shaped frame | 22, 220: upper plate |
| 23, 230: end plate | 30, 300: busbar frame |
| 301: insertion part | 310: adhesive member |

| [Description of Reference Numerals] | |
|---|---|
| 40, 400: insulating member | 410: upper surface part of the insulating member |
| 411: hole | 420: both side surface part of the insulating member |
| 421a: downwardly folded part | 421b: upwardly folded part |
| P: folding part | 430: wrinkled part |
| 500: fixing member | 60, 600: thermally conductive resin layer |

The invention claimed is:

1. A battery module comprising:
a battery cell stack comprising a plurality of battery cells;
a housing accommodating the battery cell stack;
a busbar frame that covers front and rear surfaces of the battery cell stack; and
an insulating member comprising an insulating member upper part and first and second insulating member side parts,
wherein the insulating member surrounds an upper surface and first and second side surfaces of the battery cell stack, and is between the battery cell stack and the housing, and
wherein each of the first and second insulating member side parts comprises a plurality of folded parts,
wherein the housing comprises a housing bottom part and first and second housing side parts, and
wherein each of the first and second insulating member side parts is between the first and second housing side parts, respectively, and an outermost battery cell of the battery cell stack adjacent to the respective first or second housing side part.

2. The battery module of claim 1, wherein:
each of the first and second insulating member side parts comprises an elastic material.

3. The battery module of claim 1, wherein:
the plurality of folding parts are defined by each of the first and second insulating member side parts repeatedly folding downward from the insulating member upper part and folding upward from a position where the housing bottom part and the respective first or second housing side part are adjacent.

4. The battery module of claim 3, wherein:
the plurality of folded parts comprises two folded parts folding downwards and two folded parts folding upwards.

5. The battery module of claim 1, wherein:
a size of each of the plurality of folded parts corresponds to a size of the outermost battery cell of the battery cell stack.

6. The battery module of claim 1, wherein:
the plurality of folding parts are defined by a folding part at a portion where each of the first and second insulating member side parts fold, wherein the folding part is in a direction perpendicular to the plurality of folded parts.

7. The battery module of claim 1, further comprising:
a wrinkled part between the insulating member upper part and each of the insulating member side parts, respectively.

8. The battery module of claim 1, wherein:
the first and second insulation member side parts join to each other through a side surface of the busbar frame and an adhesive member.

9. A battery pack comprising the battery module of claim 1.

* * * * *